J. W. BLOOM.
PRESS WHEEL ATTACHMENT FOR LISTERS.
APPLICATION FILED JUNE 7, 1917.
1,259,826.
Patented Mar. 19, 1918.
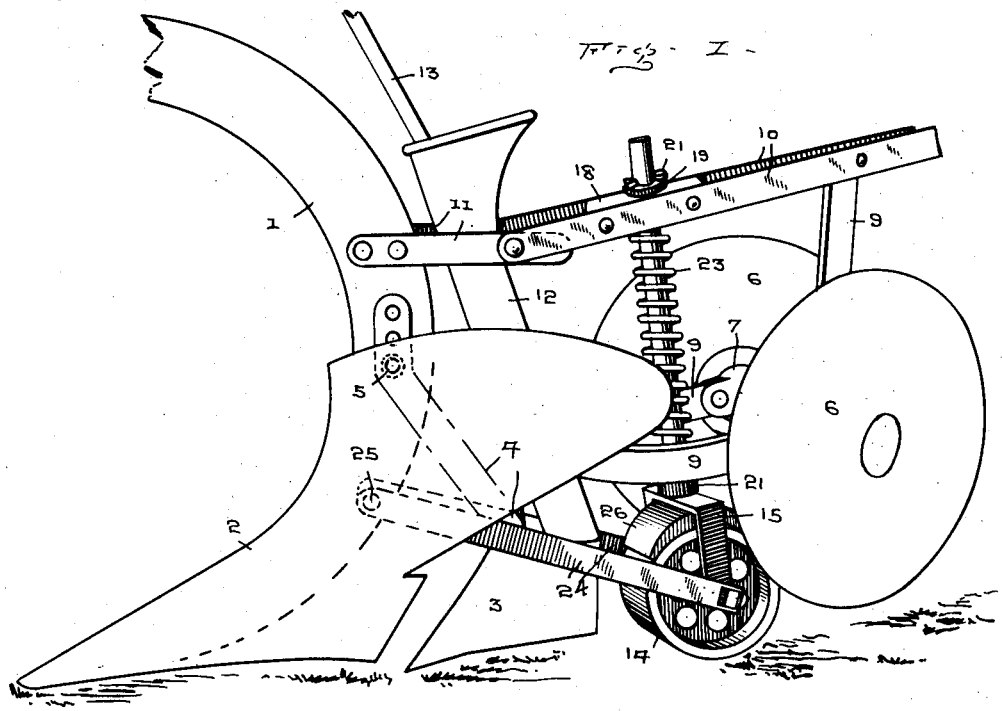
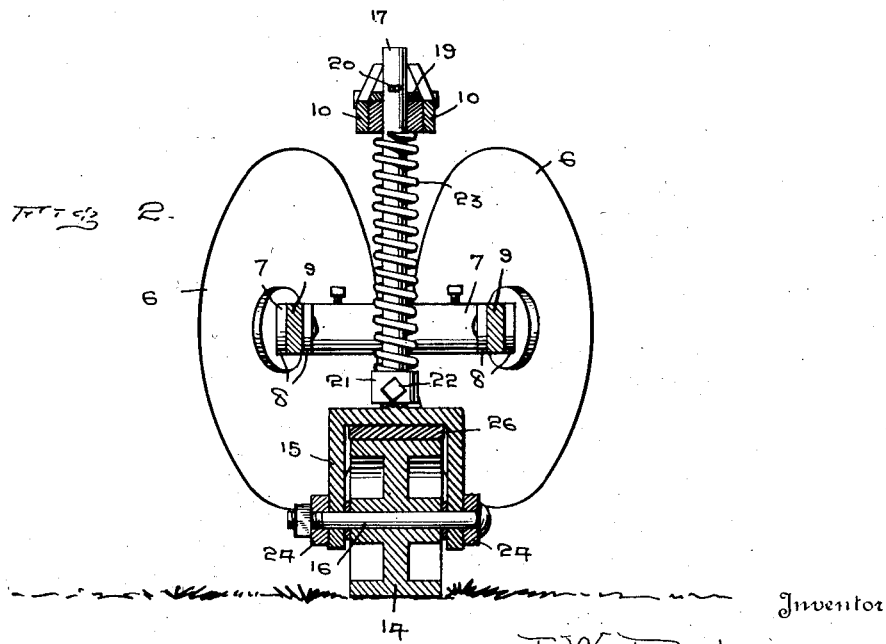

UNITED STATES PATENT OFFICE.

JOEL W. BLOOM, OF MASCOT, NEBRASKA.

PRESS-WHEEL ATTACHMENT FOR LISTERS.

1,259,826.   Specification of Letters Patent.   Patented Mar. 19, 1918.

Application filed June 7, 1917. Serial No. 173,410.

*To all whom it may concern:*

Be it known that I, JOEL W. BLOOM, a citizen of the United States, residing at Mascot, in the county of Harlan and State of Nebraska, have invented certain new and useful Improvements in Press-Wheel Attachments for Listers; and I do hereby declare the following to be a full, clear, and exact description of the invention, such as will enable others skilled in the art to which it appertains to make and use the same.

This invention relates to new and useful improvements in press wheel attachments for hand moldboard listers and the primary object of the invention is to arrange a press wheel between the subsoiler and the disk coverers and to provide resilient tension means bearing on the press wheel whereby when the lister is being operated, the press wheel will follow along closely behind the subsoiler and press the corn as it is dropped down in the bottom of the furrow which will be subsequently covered with loose soil by the disk coverers following.

By arranging the press wheel between the subsoiler and the disk coverers, the corn is permitted to be covered by loose dirt, which will not bake and form an impenetrable hard crust to stimulate the growth of weeds and retard the growth of the corn but which will give the corn a better chance to come up through the ground.

A further object of the invention is to provide a press wheel attachment which is of simple and inexpensive construction and which is of durable and substantial design.

With these and other objects in view as will appear as the description proceeds, the invention comprises the various novel features of construction, combination and arrangement of parts as will be more fully described hereinafter and set forth with particularity in the appended claims.

Referring to the drawings;

Figure 1 is a perspective view of a hand moldboard lister showing my improved press wheel attachment operatively associated therewith, and Fig. 2 is a vertical transverse sectional view through the press wheel attachment and its supporting means.

Similar characters of reference are used to denote corresponding parts throughout the accompanying drawings and the following description.

Heretofore press wheel attachments have been designed for use in rear of the disk coverers of ordinary hand moldboard listers which pressed down the loose earth which had been thrown into the furrow over the corn, thus not only pressing down the corn within the furrow but also pressing down any weed seed that may be present. This would give the weeds a chance to outgrow the corn and consequently retard or kill the growth of the corn. By pressing the loose earth on top of the corn furrow it would bake under the sun's rays and form a substantially impenetrable hard crust so that it is very near impossible for the corn to come up through it. It is to obviate the above mentioned undesirable features that applicant has designed his present form of press wheel attachment.

By arranging the present form of press wheel between the subsoiler and the disk coverers, and immediately behind the subsoiler, it will follow along within the furrow and press the corn down into the ground and allow the same to be covered over with loose soil through the medium of the disk coverers, this loose soil giving the corn a chance to come up and at the same time preventing weeds from outgrowing the corn or in fact from growing at all as it is well known that weeds will not readily grow in any kind of soil except that having a hard or baked crust.

Referring more particularly to the drawings, the reference numeral 1 indicates the plow beam to which is attached the double winged moldboard plow 2 and behind which is arranged the subsoiler plow 3 which is attached to suitable standards 4 that are adjustably connected to the plow beam 1 as indicated by the numeral 5 whereby the cutting depth of the subsoiler may be varied at will.

Arranged in rear of the subsoiler is a pair of disk coverers 6 that are journaled in suitable bearings 7. Each of these bearings 7 is provided with a pair of ears 8 between each pair of which is pivoted one end of a drag bar 9, while the opposite end of each bar is attached to the plow beam. The disk coverer bearings 7 are attached to a vertically disposed bar 9, the upper end of this bar being secured between a pair of supporting arms 10. These supporting arms 10 are arranged in parallel relation and are disposed in substantially a horizontal plane. The forward ends of the supporting arms 10 are connected to bars 11 which are in turn connected to the plow beam 1.

A boot 12 is arranged between the bars 11 and extends downwardly and has its discharge end positioned directly in rear of the subsoiler. The upper end of the boot is enlarged as shown and has extending into it the usual discharge pipe 13.

My invention consists of a press wheel 14 that is journaled in a yoke member 15 through the medium of an axle 16. Attached to the upper central portion of the yoke member is a vertically disposed rod 17 which projects through a spacing block 18 arranged between the supporting arms 10. The rod 17 is prevented form being ordinarily removed from the block 18 through the medium of a washer 19 arranged over its upper end and bearing on the spacing block and a cotter pin 20 extending transversely through the rod. The rod 20 has mounted on and adjacent its lower end an adjustable collar 21 which is adapted to be held in any adjusted position through the medium of a set screw 22, and positioned on the rod between the adjustable collar and the spacing block is an expansive spring 23. The expansive force of this spring is utilized while the lister is being operated to press the press wheel down into and on the bottom of the furrow so as to press the corn in the ground. The expansive force of this spring is also utilized while the lister is being transported over the ground to support the subsoiler and the disk coverer off of the ground to facilitate easy and ready movement of the lister over the ground.

In order to hold and maintain the press wheel immediately behind and in alinement with the subsoiler I have provided a pair of arms 24, one end of each of which is mounted on the axle 6 while the opposite end is pivoted to the plow beam 1, as indicated by the numeral 25.

The yoke member 15 is provided with a mud scraper 26 that is adapted to bear upon the periphery of the press wheel and serves to effectively keep the wheel clean and free from mud or soil caking thereon.

I claim:

1. In a lister embodying a moldboard-plow and a subsoiler, a press wheel attachment comprising a press wheel, means for maintaining the press wheel immediately behind and in alinement with said subsoiler, means for yieldingly pressing said press wheel downwardly on the bottom of the furrow, and means for varying the tension of said pressing means.

2. In a lister embodying a moldboard-plow, a subsoiler, and a pair of disk coverers, a press wheel disposed between said subsoiler and disk coverers, means for maintaining said press wheel in alinement with said subsoiler, and means for yieldingly pressing said press wheel on the ground.

3. In a lister embodying a moldboard plow, a subsoiler, a pair of disk coverers and supporting means for the disk coverers, a press wheel arranged between said subsoiler and disk coverers, and resilient tension means disposed between said supporting means and press wheel, the tension of said means being utilized to press the press wheel on the ground while the lister is being operated and when the lister is inoperative to support the subsoiler and disk coverers off of the ground to facilitate easy travel of the lister over the ground.

4. In a lister embodying a moldboard-plow, a subsoiler, a pair of disk coverers and means for supporting said disk coverers, a press wheel attachment disposed between said subsoiler and disk coverers and comprising a yoke member, a press wheel journaled in said yoke member, a rod projecting upwardly from said yoke member and through said supporting means, an expansion spring mounted on said rod between said yoke member and supporting means, and means for holding said press wheel immediately behind said subsoiler.

5. In a lister embodying a moldboard-plow, a subsoiler, a pair of disk coverers and means for supporting said disk coverers, a press wheel attachment disposed between said subsoiler and disk coverers and comprising a yoke member, a press wheel journaled in said yoke member, a rod projecting upwardly from said yoke member and through said supporting means, an expansion spring mounted on said rod between said yoke member and supporting means, means for varying the tension of said spring, and means for holding said press wheel immediately behind said subsoiler.

In testimony whereof I have signed my name to this specification in the presence of two subscribing witnesses.

JOEL W. BLOOM.

Witnesses:
F. P. NIELSEN,
F. F. ROEPKE.